United States Patent [19]

Magnus

[11] 4,264,542
[45] Apr. 28, 1981

[54] METHOD OF LINING TUNNELED TUBES

[75] Inventor: Wolf Magnus, Norderstedt, Fed. Rep. of Germany

[73] Assignee: Hochtief AG vorm. Gebr. Helfmann, Essen, Fed. Rep. of Germany

[21] Appl. No.: 41,110

[22] Filed: May 21, 1979

Related U.S. Application Data

[62] Division of Ser. No. 937,971, Aug. 30, 1978, Pat. No. 4,209,338.

[30] Foreign Application Priority Data

Sep. 2, 1977 [DE] Fed. Rep. of Germany ....... 2739568

[51] Int. Cl.$^3$ .................... B28B 23/02; B28B 23/06
[52] U.S. Cl. ........................................ 264/32; 52/659; 249/11
[58] Field of Search .............. 264/32; 249/11; 52/659; 106/99

[56] References Cited

U.S. PATENT DOCUMENTS

| 2,089,149 | 8/1937 | Longenecker | 264/32 |
| 3,429,094 | 2/1969 | Romualdi | 106/99 X |
| 3,650,785 | 3/1972 | Ball | 106/99 X |
| 3,834,916 | 9/1974 | Kesler | 106/99 |
| 3,986,885 | 10/1976 | Lankard | 106/99 |
| 4,106,300 | 8/1978 | McNeill | 264/31 X |
| 4,121,943 | 10/1978 | Akazawa | 106/99 |

OTHER PUBLICATIONS

German Industrial Standard DIN 1045, 1972, p. 21.
German Industrial Standard of 1978.

*Primary Examiner*—Thomas P. Pavelko
*Attorney, Agent, or Firm*—Karl F. Ross

[57] ABSTRACT

A method of lining a tunnel wall comprises the pumping of concrete between a support and the tunnel wall, the concrete being selected from the concretes of concrete group BII of German Industrial Standard (DIN) 1045 and containing as an additive, steel pins, rods or wires having a length of 35 to 50 mm and a diameter of 0.8 to 1.2 mm. Approximately 100 kg/m$^3$ of concrete is constituted by the steel pins or wires.

2 Claims, No Drawings

METHOD OF LINING TUNNELED TUBES

This is a division of application Ser. No. 937,971, filed Aug. 30, 1978 now U.S. Pat. No. 4,209,338.

FIELD OF THE INVENTION

The present invention relates to the formation of concrete tunnel linings and, more particularly, the casting in situ of concrete within a tunnel.

BACKGROUND OF THE INVENTION

It has been proposed heretofore to line subterranean structures, generally referred to hereinafter as tunnels, with concrete in the course of manufacture or as a means of holding the previously formed structure.

One of the techniques used for this purpose is to pump concrete between a metal shell as it is advanced along the subterranean structure, the concrete filling the space between this shell and the rock or earth wall.

The concrete thus remains in place as a timbering while the tunnel is advanced in the desired direction, e.g. by tunnel excavating machines.

It is also known to leave a metal tunnel lining in place within the subterranean structure and to grout the space between this metal lining and the wall of the tunnel with concrete.

The present invention relates to improvement in such systems and, in general, to the provision of a reinforced concrete for the specific purpose of lining tunnel walls by pumped emplacement.

A tunnel wall which is lined with concrete is generally more stable than a wall built up or timbered from other structural elements and is highly desirable for the formation of water-carrying tunnels, tunnels for transport purposes or mine-shaft tunnels and the like.

The concrete structure within a tunnel must be capable of withstanding compressive forces which result from sinking of the earth, hydrostatic pressures and the like i.e. must be load bearing.

It has been the practice, as noted above, to pump the concrete between a shell and the subterranean structure wall, e.g. directly behind a tunnel-excavating machine. The machine shell may thus form the falsework around which the concrete lining is formed.

It has been proposed heretofore, in addition, to provide a structural-steel reinforcement in the space between the falsework and the subterranean structure, this reinforcing network being imbedded in the concrete.

However, in many instances, the provision of such reinforcing steel is not possible and, as a rule, tunnel linings are formed without steel reinforcements.

True, it is known to provide tunnel linings which are cast in place from concrete which contains steel fibers of a length of about 25 mm and a diameter of about 0.2 mm. This increases the tensile strength of the concrete but has not been found to significantly and positively affect the compressive strength thereof. In addition, the use of such fibers is disadvantageous since they seem to give rise to separating phenomena during the pumping operation.

It is recognized in concrete emplacement operations generally that separation of the components of the concrete for the "mix" is a significant problem.

In practice it has been observed with the use of such steel fibers and conventional tunnel-lining concretes that the steel fibers tend to become inhomogeneously distributed upon pumping of the concrete and tend to gather in porcupine-like balls. The regions of the hardened concrete at which such porcupine-like balls are located are found to constitute singular locations in the finished construction whose compressive strength is less than that of other locations and may be well below the minimum compressive strength required for the tunnel lining.

As a result of these singular locations, the tunnel lining does not have the desired degree of homogeneity or the isotropic characteristics which have been found to be necessary to resist the stresses to which the lining may be subject.

Attempts made to redistribute the steel fibers, e.g. by vibration or the like, have not proved to be completely successful from either an economic or a technological viewpoint.

OBJECT OF THE INVENTION

It is the principal object of the present invention to provide an improved method for lining tunnel walls whereby the disadvantages of the earlier systems described above are avoided.

It is another object of the invention to provide a new use for concrete compositions.

SUMMARY OF THE INVENTION

These objects and others which will become apparent hereinafter are attained, in accordance with the present invention, which is based upon my surprising discovery that a certain class of concrete can be combined effectively with steel pins or rods of a limited length and diameter to completely overcome the disadvantages of the earlier systems.

The concrete composition used with the method of the present invention has been found to be readily pumpable so that it can be forced between the support shell and the tunnel wall and has both the tensile strength characteristics and the compressive strength characteristics of reinforced concrete without the danger of separation and balling up of the filling material. The tunnel linings produced by the method and concrete composition of the present invention are thus homogeneous and isotropic with respect to their properties over large tunnel stretches.

The concrete composition used with the method of the invention consists essentially of a concrete of group II (BII) of German Industrial Standard DIN 1045 which corresponds essentially to type II concrete of the Federal Specification SS-C-192 for portland cement. Such a concrete can have a cement content of 400 kg/m³ with a slump (DIN 1045) of say 52 cm in its pumpable state. The aggregate composition should lie in the sieve-size range between lines A and B of the curve (FIG. 4) at page 221 of the so-called Betonkalender 1978 (concrete calendar 1978) containing an extract of German Industrial Standard DIN 1045. The maximum aggregate size is 16 mm.

In the composition used with the present invention, this concrete is combined with a steel-pin additive which consists of about 100 kg/m³ of concrete of steel pins (the preferred additive range being between 50 and 150 kg/m³ of concrete), the steel pins having a length between about 35 and 50 mm, preferably between 40 and 45 mm, and a diameter between 0.8 and about 1.2 mm, preferably about 1 mm.

This concrete is mixed with water and is pumped into the space between a support shell and the tunnel wall.

Best results are obtained with 100 kg/m³ of the additive to the concrete, the additive consisting of steel pins of a diameter of 1 mm and a length of 40 to 45 mm. The pins can be of circular cross section or can be somewhat flattened in which case the maximum thickness dimension is about 1 mm.

Surprisingly, when such a concrete is used, e.g. with a slump (DIN 1045) of about 52 cm, it is readily pumpable and fills the space between the support shell and the tunnel wall uniformly without balling of the steel pins.

The steel pins can be admixed with the gravel-cement premix without special techniques and the concrete structure is found to be formed without separation or singular points or zones of the type characterizing earlier systems.

Apparently the steel pins within the critical size range given above interact with the other aggregates of the concrete mix to prevent separation and balling.

Another surprising advantage of the concrete composition and method of the present invention is that it provides a significant improvement in the tensile strength and the compressive strength of the concrete over earlier tunnel-lining systems. A particularly important advantage is the increased earlier setting strength with the steel-pin additive, thereby facilitating the speed with which the concrete sets to a high compressive strength and the rate at which tunnel structures can be made.

SPECIFIC EXAMPLE

For each m³ of concrete, 240 kg of portland cement of strength class 350 and higher, 280 kg of portland cement of strength class 250 and the aggregate are combined. The aggregate can be sand and gravel with a continuous particle-size distribution up to 32 mm and including aggregate from at least three particle-size groups. It can also consist of a noncontinuous distribution from at least two particle-size groups which are separately prepared, stored and combined. One particle-size group must lie in the range of up to 2 mm. For aggregate up to 8 mm and up to 16 mm, it suffices to separate the aggregate into one group up to 2 mm particle size and a larger particle-size aggregate group. Dust particulates are not considered as a particle-size group in accordance with this invention.

The water-cement ratio (W/C ratio), i.e. the ratio of the water content W to the weight of cement C in the concrete, need not be particularly great in accordance with the present invention. It suffices to use a water-cement ratio which will bring about desired consistency and viscosity to enable the concrete to be pumpable.

The water-cement ratio can thus be up to 0.75 and where the cement is of strength class 250 the value should not exceed 0.65.

In general the concrete which is used should be from strength classes Bn50 to Bn550, the dimensions of the Bn numbers being in kilopond/cm² (i.e. kilograms force/cm²).

I claim:

1. In a method of forming a tunnel wherein a subterranean tube is excavated, concrete is applied to the wall of said tube as a load-bearing structure, the improvement wherein:
   (a) a concrete mix of cement, aggregate and water forming a concrete of the concrete group B II of German Industrial Standard DIN 1045 is formed at a location remote from the tunnel excavation by mixing with the cement, aggregate and water a steel-pin additive in an amount of about 100 kg/m³, the steel-pin additive consisting essentially of steel wire sections having lengths of 35 to 50 mm and thicknesses of 0.8 to 1.2 mm so as to uniformly disperse said steel wire sections in the resulting concrete mix, said mix forming a concrete of strength class Bn 350;
   (b) pumping said mix without agglomeration of said steel wire sections and separation thereof from the remainder of said mix to the excavation and introducing said mix between said wall and a form work juxtaposed therewith; and
   (c) hardening said mix against said wall without agglomeration or separation of said sections into a load-bearing structure.

2. The improvement defined in claim 1 wherein said sections have lengths of 40 to 45 mm and thicknesses of about 1 mm.

* * * * *